UNITED STATES PATENT OFFICE.

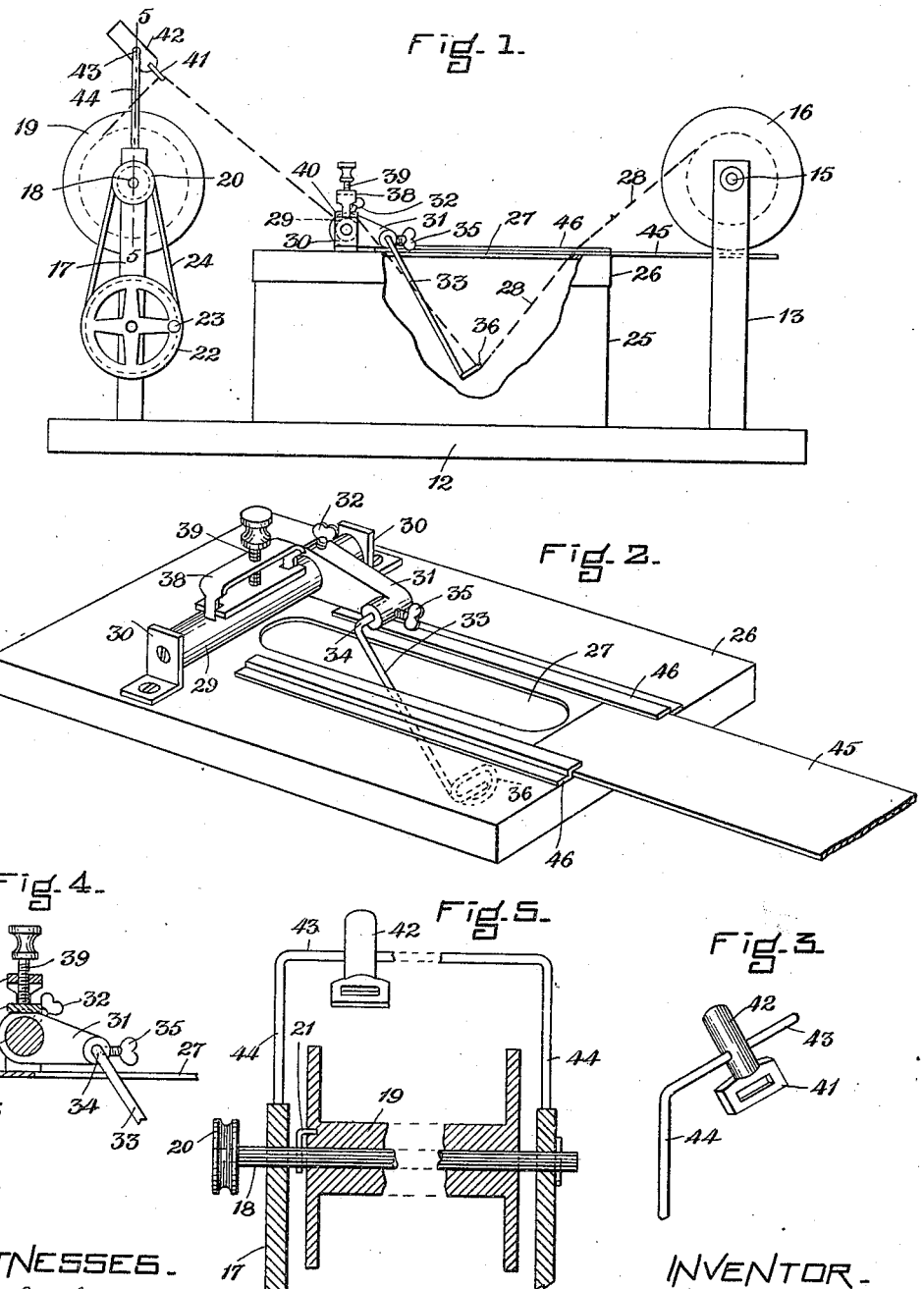

JAMES H. LA BATE, OF BROCKTON, MASSACHUSETTS.

MACHINE FOR APPLYING CEMENT TO TAPE, &c.

999,458.

Specification of Letters Patent. Patented Aug. 1, 1911.

Application filed April 6, 1911. Serial No. 619,308.

*To all whom it may concern:*

Be it known that I, JAMES H. LA BATE, a citizen of the United States, and a resident of Brockton, in the county of Plymouth and State of Massachusetts, have invented certain new and useful Improvements in Machines for Applying Cement to Tape, &c., of which the following is a specification.

This invention has for its object to provide a simple, conveniently operated, and effective machine for applying liquid cement to an elongated strip such as a narrow tape which is used in the manufacture of boot and shoe uppers, the tape being cemented to certain parts of the upper.

The invention consists in the improvements which I will now proceed to describe and claim.

Of the accompanying drawings which form a part of this specification,—Figure 1 represents a side elevation of a machine embodying my invention; Figs. 2 and 3 represent perspective views of parts of the machine; Fig. 4 represents a section or detailed view; Fig. 5 represents a section on line 5—5 of Fig. 1.

Similar reference characters indicate the same or similar parts in all the figures.

In the drawings, 12 represents a base to one end portion of which are attached standards 13 supporting a rod or spindle 15 on which is rotatably mounted a spool 16 having a supply of tape to be coated with cement. The spindle 15 is removable from the standards so the spool may be removed and a new one applied. Near the opposite end of the base are standards 17 having bearings in which is journaled a spindle 18 adapted to support and engage a spool 19 on which the cement coated tape is wound. The spindle 18 is removable endwise from the standards 17 and from the spool 19 to permit the application and removal of the spool 19, the spindle being provided with a pulley 20 by which it may be rotated and with an angular finger 21 removably inserted in an orifice in the spindle and adapted to enter an orifice in one end of the spool, as shown by Fig. 5. The finger 21 establishes a connection between the spindle 18 and the spool 19 causing the latter to rotate with the spindle. The removability of the finger from the spindle permits the spindle to be withdrawn from and inserted in its bearings in the standard 17.

22 represents a driving pulley mounted to rotate on one of the standards 17 and adapted to be rotated by hand through a crank 23, said pulley being connected with the spindle pulley 20 by a belt 24.

25 represents a cement tank mounted on the base 12 between the supports for the two pulleys, said tank having a removable cover 26 containing a slot 27 through which a tape 28 passing from the spool 16 to the spool 19 may pass, as indicated by Fig. 1.

29 represents a fixed bar which is preferably cylindrical and is supported by brackets 30 above the upper surface of the cover 26.

31 represents an angular arm which has an orifice loosely encircling the bar 29, the arm 31 being adapted to swing on the bar and provided with a set screw 32 whereby it may be secured to the bar.

33 represents an extension preferably composed of a length of stout wire having a bent end 34 inserted in a socket in the arm 31 and secured therein by a set screw 35. The outer end of the extension 33 is provided with an eye or guide 36 through which the tape 28 is adapted to pass. The extension 33 is adapted to extend through the slot 27 so that its guide 36 may be located below the surface of the body of cement in the tank 25. The slot 27 is wide enough to permit the guide 36 to pass through it. The arm 31 and extension 33 are adapted to be raised by loosening the set screw 32 and turning the arm on the bar 29 until the extension 33 is elevated above the box where it may be held by tightening the set screw 32, the guide 36 being thus supported in convenient position for the threading of the tape through it before the cementing operation. When the guide 36 is depressed into the tank it may be supported at any desired distance above the bottom of the tank by turning the arm 34 in the socket on the arm 31 and tightening the set screw 35.

38 represents a yoke rigidly attached to the bar 29 and having a screw-threaded socket with which an adjusting screw 39 is engaged.

40 represents a presser, the ends of which are slotted and guided by the ends of the yoke 38, said presser being adapted to bear on the upper side of the portion of the tape 28 which passes between the presser and the bar 29. The bar and presser constitute means for rubbing off the surplus cement from the tape, the presser being adjustable by means of the screw 39. This mechanism, and also the bar 29 and the guide arm 33 adjustable thereon, being supported by the cover, enables their relative positions to be maintained whenever access to the tank is required. In other words, if the tank is to be emptied and cleaned or filled, the cover can be moved away and with it all of the parts that are supported thereby, so that when the cover is replaced the said parts need no readjustment.

41 represents a slotted guide having a handle 42 which is perforated to engage a cross bar 43 between uprights 44 which are attached to the standards 17. The guide 41 is moved by the handle 42 lengthwise of the spool 19, its function being to cause the cement coated tape to be wound properly on the spool 19.

The operation is as follows: A spool of tape being mounted on the standard 15, its leading end is passed through the guide 36 while the latter is elevated, and is also passed between the bar 29 and the presser 40 and through the guide 41 to the spool 19. The guide 36 being lowered into the tank and the spool 19 rotated by the means described, the tape is drawn continuously from the spool 16 through the cement tank, the cement coated tape being accumulated on the spool 19.

45 represents a slide which is movable between guides 46 on the cover 26, and is adapted to close the slot 27 when the machine is not in use, to prevent evaporation of the cement.

I claim:

1. A cementing machine comprising a base, means for rotatively supporting a delivering spool at one end portion of the base, means for rotatively supporting a receiving spool at the opposite end portion of the base, a cement tank between said end portions, having a movable cover and a longitudinal slot therein, a fixed bar supported by the cover and extending crosswise of the slot and movable with the cover, an arm mounted to swing on said bar and having means whereby it may be secured to the bar in different positions, said arm being formed to project through the slot when swung downwardly and having a guide in its outer end, and a presser supported by the cover above the bar and adapted to coöperate therewith in removing surplus cement from a strip.

2. A cementing machine comprising a base, means for rotatively supporting a delivering spool at one end portion of the base, means for rotatively supporting a receiving spool at the opposite end portion of the base, said means including a rotatable spindle adapted to detachably engage the receiving spool, means for rotating said spindle and the spool thereon, a fixed rod located above said spindle, a strip guide laterally movable on said rod, a cement tank between the end portions of the base, a movable cover for said tank, means for guiding a strip through a body of cement in the tank, and means for removing surplus cement from the strip, said guiding means and surplus removing means being mounted on the tank cover and movable therewith.

3. A cementing machine comprising a base, means for rotatively supporting a delivering spool at one end portion of the base, means for rotatively supporting a receiving spool at the opposite end portion of the base, a cement tank betwen said end portions having a movable cover and a longitudinal slot therein, a fixed bar supported by the cover and extending crosswise of the slot and movable with the cover, an arm mounted to swing on said bar and having means whereby it may be secured to the bar in different positions, said arm being formed to project through the slot when swung downwardly and having a guide in its outer end, a yoke attached to the bar, a presser adjustably engaged with the yoke, and an adjusting screw engaged with the yoke and bearing on the presser.

4. A cementing machine comprising a base, means for rotatively supporting a delivering spool at one end portion of the base, means for rotatively supporting a receiving spool at the opposite end portion of the base, a cement tank between said end portions, having a removable cover and a longitudinal slot therein, a fixed bar supported by the cover and extending crosswise of the slot and movable with the cover, an arm composed of an inner portion mounted to swing on said bar and provided with a set screw whereby it may be attached to the bar in different positions, and an extension pivoted to said inner portion and having a strip guide at its outer end, the inner portion of the arm having means for securing the extension thereto in different positions.

In testimony whereof I have affixed my signature, in presence of two witnesses.

JAMES H. LA BATE.

Witnesses:
  JAMES LAYS,
  GERTRUDE E. SPENCER.

Copies of this patent may be obtained for five cents each, by addressing the "Commissioner of Patents, Washington, D. C."